United States Patent
Kapczynski et al.

(10) Patent No.: US 7,039,655 B2
(45) Date of Patent: May 2, 2006

(54) SYSTEM AND METHOD FOR PROVIDING A DIGITAL MEDIA SUPPLY CHAIN OPERATION SYSTEM AND SUITE OF APPLICATIONS

(75) Inventors: Mark Joseph Kapczynski, Santa Monica, CA (US); Freddy Goeske, Calabasas, CA (US)

(73) Assignee: Mesoft Partners, LLC, Burbank, CA (US)

( * ) Notice: Subject to any disclaimer, the term of this patent is extended or adjusted under 35 U.S.C. 154(b) by 0 days.

(21) Appl. No.: 10/820,196

(22) Filed: Apr. 6, 2004

(65) Prior Publication Data

US 2004/0199578 A1   Oct. 7, 2004

Related U.S. Application Data

(60) Provisional application No. 60/461,593, filed on Apr. 7, 2003.

(51) Int. Cl.
    G06F 7/00   (2006.01)
(52) U.S. Cl. .................... 707/104.1; 707/1; 707/2
(58) Field of Classification Search ......... 707/1–104.1; 710/266, 260, 264, 1, 36; 360/66, 55; 375/211, 375/213; 709/223–226, 230–234, 238–244; 395/200.53–200.55, 200.59, 200.7
    See application file for complete search history.

(56) References Cited

U.S. PATENT DOCUMENTS

| | | | |
|---|---|---|---|
| 6,442,573 B1* | 8/2002 | Schiller et al. | 715/500.1 |
| 6,573,907 B1* | 6/2003 | Madrane | 345/719 |
| 6,643,652 B1* | 11/2003 | Helgeson et al. | 707/10 |
| 6,957,199 B1* | 10/2005 | Fisher | 705/78 |
| 2002/0033844 A1* | 3/2002 | Levy et al. | |
| 2002/0078446 A1* | 6/2002 | Dakss et al. | |
| 2002/0138582 A1* | 9/2002 | Chandra et al. | 709/206 |
| 2002/0141584 A1* | 10/2002 | Razdan et al. | |
| 2002/0188841 A1* | 12/2002 | Jones et al. | 713/153 |
| 2003/0085997 A1* | 5/2003 | Takagi et al. | |
| 2003/0158960 A1* | 8/2003 | Engberg | 709/237 |
| 2003/0177187 A1* | 9/2003 | Levine et al. | 709/205 |
| 2004/0064351 A1* | 4/2004 | Mikurak | |

OTHER PUBLICATIONS

"Question of the Day" by Howstuffworks, Inc., Copyright 1998-2001, pp. 1-3.*

* cited by examiner

Primary Examiner—Luke S Wassum
Assistant Examiner—Linh Black
(74) Attorney, Agent, or Firm—O'Melveny & Myers LLP

(57) ABSTRACT

The present invention is directed to an intelligent media router (IMR) for processing media that has been either natively created as data or has been digitized from another source. The IMR comprises a plurality of modules or engines that are interconnected in a trusted manner. The IMR can be utilized by an end-to-end system having an encoder, a system server, and a plurality of end clients. In addition, an IMR can be developed to be utilized with an integrated system to allow third party imaging systems and software to interface with the IMR. In addition, the IMR modules are designed to be able to communicate with other IMR modules in a trusted relationship. This trusted communication between the IMR modules shares digitized (data) media and routes, rights, and profiles within the IMR. The IMR looks at digitized (data) media at the digital media object (DMO) level and can perform route functions on a set of, or all DMOs that are sourced to or within the IMR.

6 Claims, 8 Drawing Sheets

SYSTEM AND METHOD FOR PROVIDING A DIGITAL MEDIA SUPPLY CHAIN OPERATION SYSTEM AND SUITE OF APPLICATIONS

RELATED APPLICATION DATA

This application claims priority pursuant to 35 U.S.C. §119(e) to U.S. Provisional Application No. 60/461,593 filed Apr. 7, 2003, for System And Method For Providing A Digital Media Supply Chain Operation System And Suite Of Applications.

BACKGROUND OF THE INVENTION

1. Field of the Invention

The present invention relates to creating, storing and distributing digital content, and more particularly, to a system and method for allowing digital content to be created, stored and distributed to multiple users across multiple devices and applications.

2. Background

The concept of digital convergence reflects the fact that, because the production of media is rapidly moving towards becoming entirely digital, it would be advantageous to facilitate the compatibility of various digital formats and devices. But digital convergence requires the integration of both software and hardware systems. Currently, there are several obstacles to providing digital convergence in the field of media production, including a general absence of integrated workflow, a lack of standards, disparate software and hardware solutions and government regulations concerning digital distribution, among other factors. For example, several entities in the digital media production chain utilize proprietary devices or systems that only work with a restricted product line.

For instance there are interface gaps between media tools and editors, such as Discreet Inferno, Avid Media Composer, Da Vinci and Final Cut Pro, for example, and software (e.g., operating, database and file systems), such as, for instance, Windows, Apple, Linux, Oracle, Pinnacle and SGI. Moreover, there are additional gaps between software and hardware, among the various manufacturers, including IBM, EMC, Sony, Panasonic and Snell, for example. Accordingly, there is a need for an open solution across a wide variety of hardware and software systems.

SUMMARY OF THE INVENTION

The present invention provides a system and method for connecting disparate information manufacturing devices and software with disparate information distributing apparatus to allow a user or group of users to utilize a wide variety of otherwise incompatible information (e.g., media) tools to create, store and distribute information (or content) and thereby facilitate information workflow. Generally, the present invention includes an information supply chain operating system and an information or media supply chain network system that covers three sections: information manufacturing, information warehousing, and information distribution. These three sections may include a number of different applications or suites of applications tailored to specific functions and industries. These underlying applications may be distributed over one or more computer systems or computer networks. The present invention facilitates information manufacturing and distribution by providing a connection interface having a plurality of interconnected routing modules or engines to create and distribute information in a trusted manner.

More specifically, the connection interface of the present invention includes an intelligent media router (IMR) for processing media that has been either natively created as data or has been digitized from another source. The IMR comprises a plurality of modules or engines that are interconnected in a trusted manner. The IMR can be utilized by an end-to-end system having an encoder, a system server, and a plurality of end clients. In addition, an IMR can be developed to be utilized with an integrated system to allow third party imaging systems and software to interface with the IMR. In addition, the IMR modules are designed to be able to communicate with other IMR modules in a trusted relationship. This trusted communication between the IMR modules shares digitized (data) media and routes, rights, and profiles within the IMR. The IMR looks at digitized (data) media at the digital media object (DMO) level—and can perform route functions on a set of or all DMOs that are sourced to or within the IMR.

In an embodiment of the present invention, an end-to-end connection system interfaces information manufacturing apparatus with information distributing apparatus. The connection system includes an intelligent media router (IMR) having a plurality of IMR modules interconnected in a trusted manner, an encoder, and a system server coupled with the encoder via the IMR. The encoder converts a first information form from the information manufacturing apparatus into data having an essence data portion and a metadata portion. The encoder then uses a tagging IMR module to tag the metadata portion of the data with metadata for routing the data. The system server then uses a distribution IMR module to direct the data for distribution by the information distributing apparatus based on the tagged metadata. In addition, the system server uses a conversion module to convert the data into a second information form acceptable for distribution by the information distributing apparatus. The connection system can further include an end client for viewing the second information form.

In another embodiment of the invention, an integrated connection system interfaces information manufacturing apparatus with media distributing apparatus. Like the end-to-end system discussed above, this system also includes an encoder and a system server coupled with the encoder. In addition, the system includes a share server coupled with the system server, an intelligent media router (IMR) coupled with the share server, a share integrate interface coupled with the encoder, and an output interface coupled with said encoder. The IMR includes a plurality of IMR modules that are interconnected through a trusted relationship. The system server provides a plurality of common services for the connection system. The share server provides a plurality of routing functions for the connection system. The integrate interface provides interfaces with one or more third party imaging systems and software to remotely provide one or more IMR inputs to the IMR. The output interface provides interfaces with one or more third party imaging systems and software to remotely provide one or more native IMR outputs of the IMR. In addition, the share server comprises a plurality of communication protocols and a plurality of software development kits (SDKs) to allow the third party imaging systems and software to remotely utilize the one or more interconnected IMR modules.

In yet another embodiment, a media routing method according to the invention includes steps as follows. Manufactured media is received into an intelligent media router (IMR). The IMR identifies the media with a unique and global identifier. An encoder converts the media into data having an essence data portion and a metadata portion. The IMR then tags the metadata portion of the data with metadata. In addition, the IMR reviews the tagged data to read a route profile. The IMR then determines a route function and a route destination for the data based on the read route profile of the data and executes the route function for the data. Next, the IMR processes a route for the data and then transfers the data from the IMR to the route destination through the processed route. The destination can include an end viewing client or another IMR.

A more complete understanding of the present invention will be afforded to those skilled in the art, as well as a realization of additional advantages and objects thereof, by a consideration of the following detailed description of the embodiment. Reference will be made to the appended sheets of drawings, which will first be described briefly.

DETAILED DESCRIPTION OF THE PREFERRED EMBODIMENT

The present invention provides a system and method for connecting disparate digital media devices and software to allow a user or group of users to utilize a wide variety of otherwise incompatible digital media tools to create, store and distribute digital content and thereby facilitate digital workflow. Generally, the present invention includes a digital media supply chain operating system and a digital media supply chain network system that covers three sections: digital manufacturing, digital warehousing and digital distribution. These three sections may include a number of different applications or suites of applications tailored to specific functions and industries. These underlying applications may be distributed over one or more computer systems or computer networks. The present invention facilitates digital manufacturing by providing a set of production tools to create and control digital media.

For example, the present invention may provide conventional digital media software with additional capabilities to facilitate digital workflow by increasing compatibility with other software and hardware systems. The present invention also provides digital warehousing capabilities by utilizing software that includes client and server technology. The digital warehouse may include several hardware and software components and allows users to digitally edit, store and output media to any desired format, whether analog or digital, including, for example, video, web and film, among other formats. In addition, the digital warehousing software may provide a real-time digital media shared workspace with virtual storage capabilities. The present invention also allows for more efficient digital distribution by providing a software infrastructure to deliver digital content to a variety of different devices and software platforms.

Figure 1:
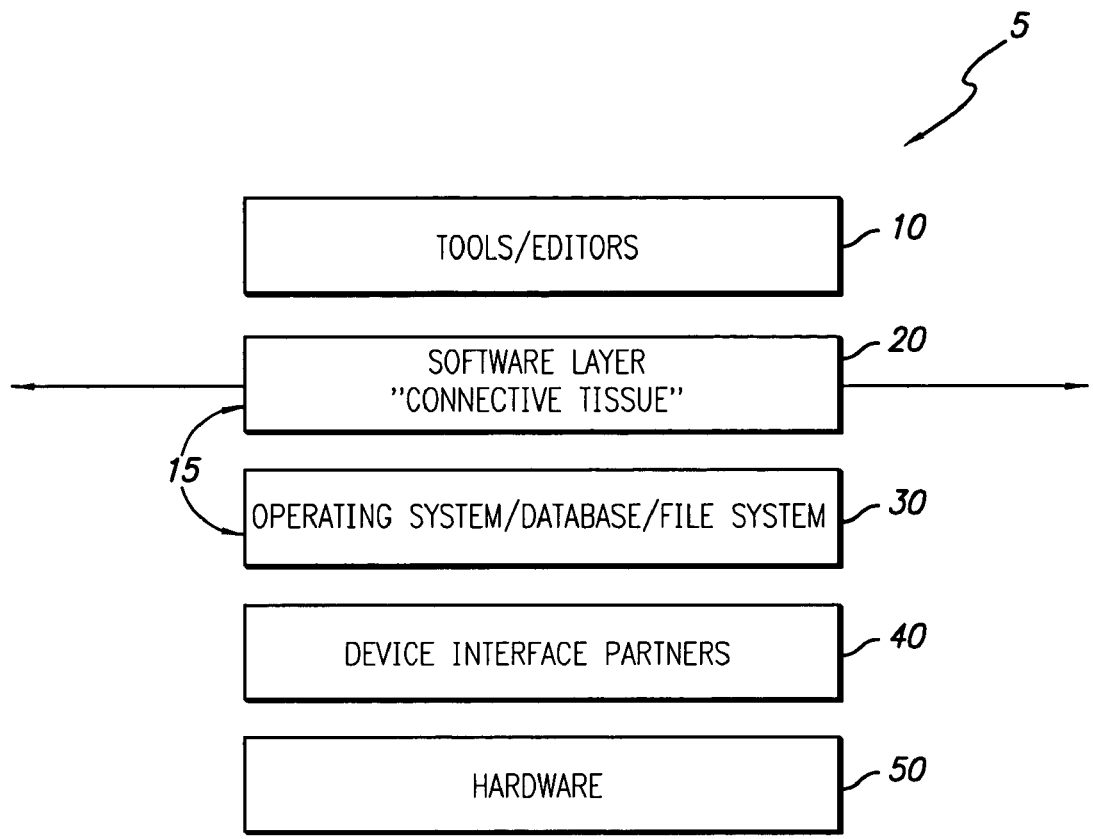
FIG. 1 shows an exemplary embodiment of the digital media supply chain operating system of the present invention.

FIG. 1 shows a conceptual block diagram of an exemplary embodiment of the digital media supply chain network system, shown generally at 5, which includes the digital media supply chain operating system, shown generally at 15. In the exemplary embodiment of FIG. 1, the digital media supply chain operating system 15 includes. a connective software layer, shown at 20, and a device interface layer, shown at 40, to provide an interface between various hardware and software components to integrate these components and thereby improve digital workflow. As discussed above, conventional digital media creation, storage and distribution are hampered by disparate hardware and software solutions. Accordingly, connective software layer 20 serves as an interface between various digital media tools and editors 10 and the user's system software, shown at 30.

Digital media tools 10 may be any software or hardware system suitable for creating or editing digital media. Examples of digital media tools 10 include, for example, Avid Media Composer, Da Vinci, Discreet Inferno and Final Cut Pro, among others. System software 30 includes the underlying software of the user's computer system, including the operating system, database, file system and similar components. System software 30 may include software systems from a variety of sources or types including, for example, Windows, Apple, Linux, Oracle, Pinnacle or SGI, among others. Device interface layer 40 provides an interface between system software 30 and various hardware devices 50. Hardware devices 50 include the user's computer system and may include various devices for the output, input or processing of digital media. Hardware devices 50 may utilize a wide variety of protocols or standards and may therefore be otherwise incompatible with system software 30 and tools 10. For example, hardware devices 50 may include devices manufactured by a variety of sources, including IBM, EMC, Sony, Panasonic and Snell, among others. Accordingly, connective software layer 20 and device interface layer 40 allow a user or a group of users to create, store and distribute digital content across a wide variety of hardware and software platforms.

Figure 2:
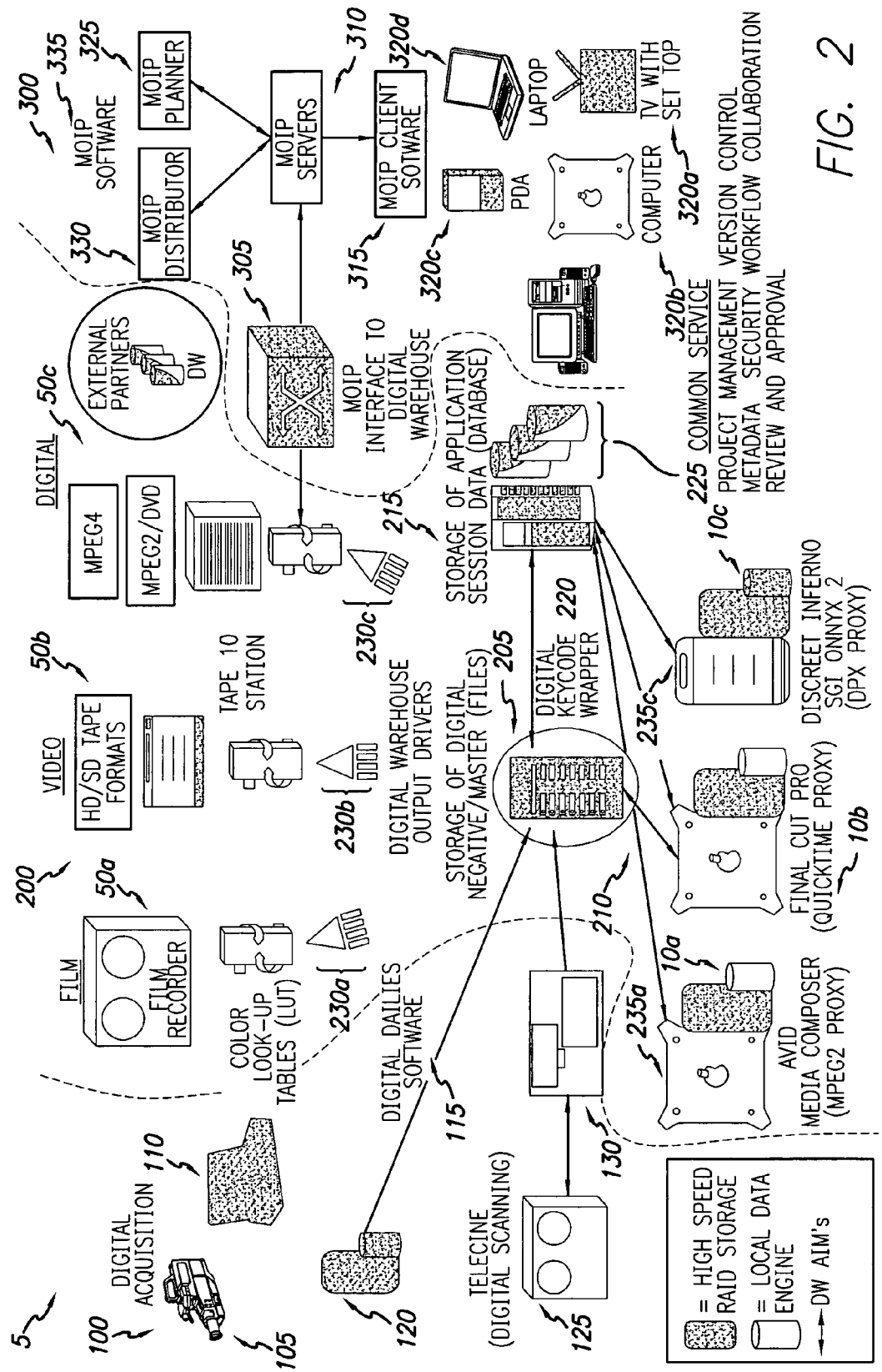
FIG. 2 shows an exemplary embodiment of the digital media supply chain network system of the present invention.

FIG. 2 shows an exemplary embodiment of the digital media supply chain network system 5. As discussed above, digital media supply chain network system 5 generally includes three sections: a digital manufacturing section, shown generally at 100, a digital warehousing section, shown generally at 200, and a digital distribution section, shown generally at 300. The digital manufacturing section 100 includes devices and software agents to acquire and create digital content for delivery into the digital media supply chain network system 5. For example, in the exemplary embodiment shown in FIG. 2, digital manufacturing 100 includes devices and software for creating movie or video content. Digital manufacturing 100 may include a video camera 105, a post-production facility 110 to color-correct and edit the video, and digital storage devices 120 (e.g., hard disks). Digital manufacturing 100 may also include digital dailies software 115, discussed below, to facilitate the integration of video data into digital media supply chain network system 5. As another example, digital media supply chain network system 5 may receive digital video data from telecine or digital scanner 125 and color correction device 130. Although the digital acquisition devices shown in FIG. 2 relate to digital video content, digital media supply chain network system 5 may receive any type of digital content from any type of device, system or software.

Digital warehouse 200 is based on client and server technology and includes both software and hardware elements. Digital warehouse 200 includes digital media supply chain operating system 15, shown in FIG. 1, to allow users to digitally edit, store and output media to any desired format, whether analog or digital, such as, for example, video, web and film, among other examples. Accordingly, digital warehouse 200 also includes a real-time storage and database engine. Digital warehouse 200 includes master file storage 205 and application session database 215. Master file storage 205 and application session database 215 may be any device or combination of devices suitable for storing digital data, e.g., hard drives, storage area network (SAN), network attached storage (NAS). Content obtained from digital manufacturing 100 may be initially stored in master file storage 205.

Digital warehouse 200 also includes one or more tools 10 to allow one or more users to access, edit, compile or otherwise utilize the data obtained from digital manufacturing 100. Tools 10 may access master file storage 205 and application session database 215. Tools 10 may include any system, device or application suitable for accessing, editing and storing digital media content. For example, as shown in FIG. 2, tools 10 include systems running Avid Media Composer 10a, Final Cut Pro 10b and Discreet Inferno SGI Onyx 2 10c applications. Accordingly, tools 10 may utilize a variety of data formats, such as, for example, MPEG2, QuickTime and DPX.

Digital warehouse 200 also includes one or more output devices 50 to allow one or more users to output or access the digital content in the desired device or format. Output devices 50 may include any device suitable for creating content, whether digital or analog. For example, output devices may include film recorder 50a, HD/SD tape drives 50b or MPEG2/DVD drives 50c. Accordingly, a user may transmit content to output devices 50 via digital warehouse 200.

In order to facilitate the interaction of different digital media products, the digital media supply chain network system 5 includes a digital keycode numbering system, shown generally at 220, a suite of common services, shown generally at 225, output drivers, shown generally at 230, for the various output devices 50, and device hooks or drivers, shown generally at 235, for the various tool sets 10.

The digital keycode or wrapper 220 provides a numerical or alphanumerical identification code for the various pieces of digital content that exist at the object level, i.e., digital media objects (DMO). As discussed below, digital content may be separated into several DMOs. A DMO may be any digital object with graphical, audio or any combination of content thereof. For example, a DMO may be a text object, a graphic object or a video object, among other examples. Accordingly, the digital keycode system 220 provides for object oriented digital media creation. In particular, the digital keycode system 220 provides a relevant link from a DMO to other data. For example, a stream of digital video content may be stored as several individual files, each representing a single frame. A digital keycode 220 may be associated with each file to allow each file to be referentially linked to a more rich set of data, such as, for example, the placement or context of this video stream file in a larger media project, the version number or type of the video stream, metadata for the video stream file or security requirements associated with the video stream file, among other examples.

The digital media supply chain network system 5 also includes a suite of common services 225 that enables the user to define each piece of digital media. Common services 225 include applications for providing project management, version control, metadata, security, workflow, collaboration and review and approval. In addition, the digital media supply chain operating system 15 also includes the hooks 235 that are required within each toolset 10 to allow the user to utilize or interact with a wide variety of digital media solutions. As a result, the user is able to utilize a wide variety of products, such as, for example, Avid Composer, Final Cut Pro or products from Adobe or Microsoft, and then interact with the resultant digital files and their subcomponents, e.g., DMOS, to create data that may be stored in an application session database 215 and thereby further enrich the common services.

Generally, a digital content file may include three components: essence data, metadata and session data. Essence data is the content of the file, such as, for example, audio, video or graphics. Metadata refers to the data regarding the data itself or the basic information about the essence data, such as a time code, file name or the date the file was created or last modified, for instance. Session data describes the file and may include the characteristics of the digital content file within the source application that was used to create the file. As discussed above, many digital content solutions are proprietary. As a result, users are limited to a selected number of file formats when using most applications. Accordingly, in order to utilize two different applications, it is often necessary to convert a file created in the first application into the proprietary format accepted by the second application. Unfortunately, the process of converting files typically results in a loss of data. For example, when converting from one file to another, the essence data may be transferred but the session data and metadata is lost. As a result, converting files to a common format or to another proprietary format diminishes the richness of the original file and results in a "flat" file.

In contrast, the connective software layer, shown at 20 in FIG. 1, of the digital media supply chain operating system 15 allows the digital media supply chain network system 5 to manage digital files at the object level. As a result, the essence data, metadata and session data may be broken out and manipulated individually. For example, a PowerPoint file may be broken down into its components—the session data (e.g., the color of a slide), the essence data (e.g., the graphics) and the metadata (e.g., the interrelation of the session and essence data)—and each component may be saved as a separate object. Once a file is separated into several separate objects, each object is saved in the digital warehouse 200 of the digital media supply chain network system 5. As a result, by storing the data files as objects, the network system 5 facilitates widespread use of the original digital content. As discussed above, the digital media supply chain network system 5 and operating system 15 include the necessary hooks 235 for each tool 10, such as, for example, an application program interface (API) or driver. Therefore, because the components of each digital data file may be stored separately, each tool 10 may write to the API 235 and accordingly share its essence data, session data and metadata more seamlessly with other tools and applications. For example, because the file components are stored separately, digital warehouse 200 may associate additional logic, e.g., a digital key code 220, to each of these components to facilitate access to the digital data file by other applications or tools. In one exemplary embodiment of the present invention, this digital key code data 200 may be stored in application session database 215.

As noted above, the digital media supply chain operating system 15 also includes hooks 235 to the tools 10 in the digital media supply chain network system 5. The hooks 235 are software agents that allow the tool to utilize the digital key code data 220 and accordingly recognize the data associated with the key code 220, in particular, data created by another tool or application. Accordingly, the hook 235 facilitates the link between the files and the application services. Therefore, the tools 10 themselves may serve as the primary interface between the user and digital media supply chain network system 5.

Because the digital media supply chain network system 5 may include several different types of applications and devices, it is important to maintain referential integrity so that each digital file may be properly associated with its native application or tool. Consequently, whenever a new digital media file is introduced into the digital media supply chain network system 5, a proxy of the digital file is created and the original file is considered a master file or negative. This proxy may be stored in the digital warehouse 200. In an exemplary embodiment of the present invention, the master file is stored in master file storage 205 and the proxy, or session data, is stored in application session database 215.

Once the proxy is created, the tool 10, e.g., the native tool or application, subsequently handles this proxy rather than the master file. Any subsequent changes made to the proxy are saved as session data associated with the master file. As a result, whenever a user wishes to create an output of the file, this session data may be applied to the master file to create the output file. Moreover, because this session data has been saved separately, it may be shared with another application or tool 10 that may, in turn, access the session data to use the digital media file because of its hooks 235 and the digital keycodes 220 associated with the components of the digital media file. As discussed above, the digital keycodes 220 allow system 5 to link a particular proxy, e.g., the session data stored in application session database 215, back to the original master file, e.g., stored in master file storage 205, to thereby provide referential integrity between the proxy and the master file.

Therefore, instead of storing files, the digital media supply chain operating system stores a collection of digital master file objects and references, e.g., keycode data 220. Storing the object components of the master file, such as the session data, separately in digital warehouse 200 facilitates the use and modification of the master file. For example, by saving the session data in digital warehouse 200, this data may be re-used and reapplied as a template to the master file. For example, for a movie file, the user may create different foreign language proxies with selected frames and length. These changes may be saved separately and later applied as a template to the original master file. As a result, instead of managing several different video streams, the user need only use one master file to which it may apply various templates.

Thus, it is easier for the user to create, store, manage and distribute the desired output file. In addition, by providing proxies, the present system facilitates collaboration because a digital data file may be shared in a more generic manner to thereby enable users with different tools 10, e.g., two different proprietary standards, to share the same work and the same data. Moreover, the user or users may create as many proxies as desired without actually creating new files, e.g., copies of the master file. In fact, the user does not need to create a file under native application until it is ready to create an output, e.g., for distribution to those outside the network that are unable to access the master or a proxy stored in the digital warehouse. For instance, the user may initially select an output type for a particular, digital media file, e.g., to a PDF file, or device, e.g., a video tape drive. The system subsequently retrieves the associated master file via the digital keycodes 220, applies the appropriate template, e.g., the session data associated with the proxy, and generates the output file using the necessary output driver or transformation engine 230. As a result, by using object oriented digital media, the digital media supply chain operating system and network system allows for more effective data management than the conventional file system approach.

Similarly, the digital media supply chain operating system 15 and digital media supply chain network system 5 may use templates to customize the output digital file for the selected output device. For example, televisions and computer monitors generally do not allow a user to view the same video data in the same manner, e.g., these devices have different resolutions and standards. Accordingly, based on the client requirements, the network system 5 may access the master file from digital warehouse 200, apply the appropriate template associated with the selected proxy and also apply the appropriate template based on the desired output format, e.g., television or web site. The file may then be delivered to the client over the network 5. For example, the digital files may be transferred using media over Internet protocol (MOIP).

Because the digital media supply chain network system 5 may support several users, any number of proxies may be created. In addition, multiple users may use the same proxy. Accordingly, although the master file is preserved, it may be preferable to implement version control and security measures to ensure that a particular proxy does not become corrupted, subject to unauthorized access, or otherwise misused. In conventional digital content creation and distribution systems, security controls are usually implemented only during distribution. In contrast, because the present invention allows multiple users to both access master files and modify proxies, security features are preferably integrated at the front end of the system, e.g., security features are active at the time files are received rather than only at the time of distribution. As a result, security features are preferably embedded at the time of digital content acquisition. Moreover, because the digital media supply chain network system 5 may support several different platforms and systems, the security functions may be implemented within the system 5, e.g., the digital media supply chain operating system 15, within other platforms, e.g., the user's computer system or tool, or any suitable combination thereof.

In another exemplary embodiment of the present invention, the digital media supply chain operating system 15 may include a common utility dashboard. As discussed above, the digital media supply chain network system 5 may include several users and a variety of different platforms and tools. Accordingly, it is desirable to present the user with an interface that provides a user with a common set of functions and features. Preferably, this common utility dashboard may be viewed from any platform or tool connected to digital media supply chain network system 5. The common utility dashboard may include a number of functions, including, for example, other applications or tools that may be accessed on digital media supply chain network system 5 and the common services, discussed above. For example, the common utility dashboard may include such services as security, format transcoding, project data, taxonomy and storage, among other examples.

Figure 3:
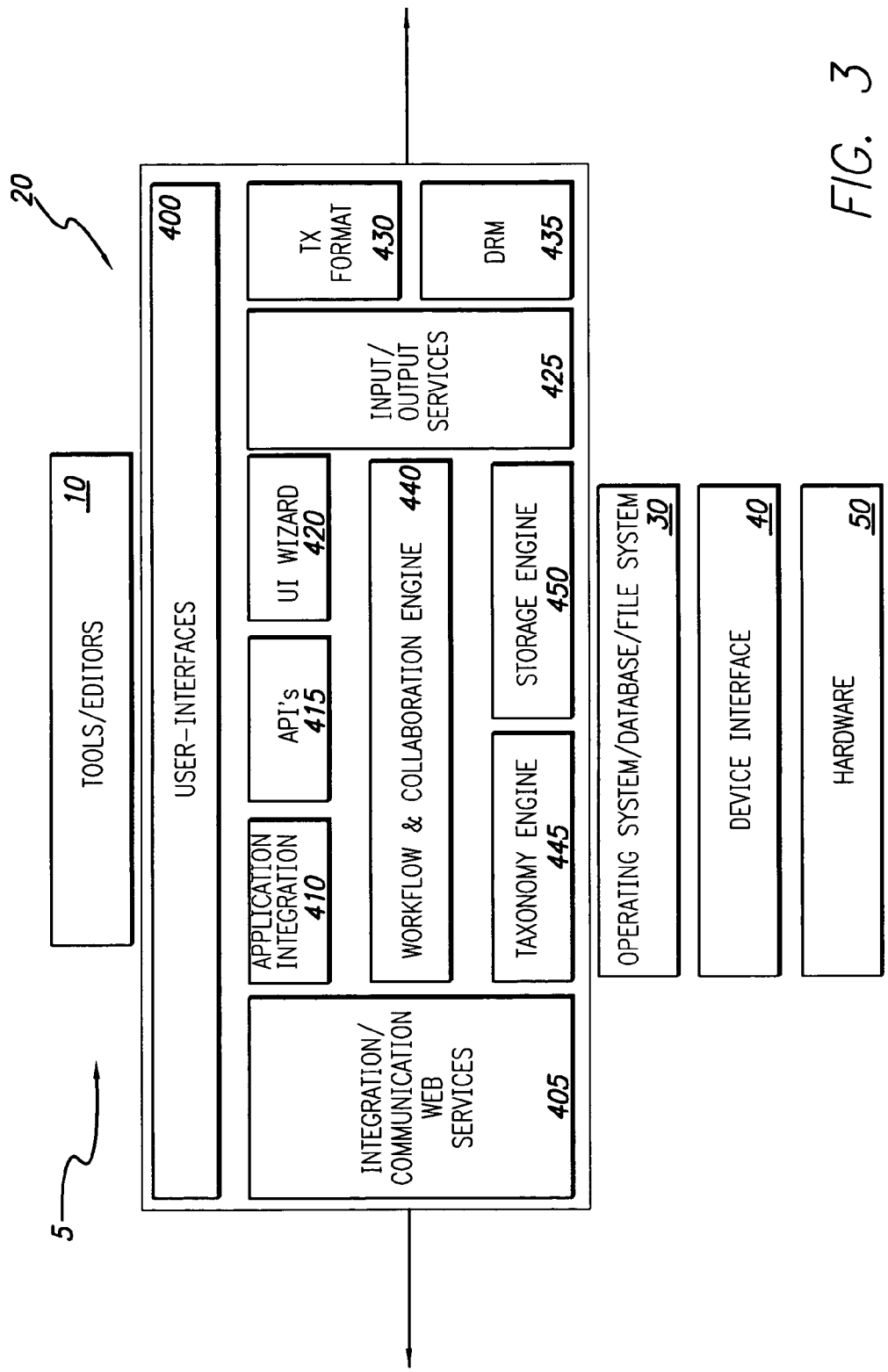
FIG. 3 shows an exemplary embodiment of the software architecture of the digital warehouse.

FIG. 3 shows an exemplary embodiment of the software architecture of digital warehouse 200. As shown in FIGS. 1 and 3, connective software layer 20 resides between tools 10 and the user's operating system 30. Connective software layer 20 includes user-interfaces 400 to receive data from and transmit to tool 10. Interface 200 may be interface software residing in a central server network, on a user computer, a tool 10, or a combination thereof. For example, a user may install digital media supply chain operating system 15, either in its entirety or selected modules, onto the user's computer system or tool 10. Accordingly, digital media supply chain operating system may run on a single computer system or may be clustered or distributed across several computers. As a result, digital media supply chain operating system 15 may provide a client centered application and allow for scalability. Consequently, a user may work off-line or connected to a network.

In order to integrate tools 10 into digital media supply chain network system 5, connective software layer 20 also includes application integration modules 410, API modules 415 and user interface (UI) wizard 420. Application integration modules 410 allows the digital media supply chain operating system 15 to interface with the tools 10 via the hooks 235, shown in FIG. 2. Each API module 415 is a software module that is designed to interface with a specific tool 10. If an API module 415 has not been generated for a specific tool 10, then UI wizard 420 may be used to auto-generate an interface module.

Workflow and collaboration engine 440 communicate with taxonomy engine 445 and storage engine 450 to allow tool 10 to retrieve and modify proxy files from digital warehouse 200 and save session data into application session database 215. Workflow and collaboration engine 440 also allows digital media supply chain operating system 15 to provide common services 225. Taxonomy engine 445 processes digital keycode data 220 to maintain the referential link between the master file stored in master file storage 205 and the associated session data stored in application session database 215. Taxonomy engine 445 also accesses and controls the characterization of data, e.g., various versions or templates associated with a master file. Storage engine 450 manages the storage and retrieval of data from digital warehouse 200.

Connective software layer also includes input/output services module 425 to manage the transmission and access of data in digital media supply chain network system 5. Input/output services module 425 communicates with the taxonomy format module 430 and the digital rights management (DRM) module 435. Taxonomy format module 430 manages format conversion to ensure that files are output to the desired format. DRM module 435 provides security to ensure that data cannot be retrieved or accessed absent proper authorization or license. Integration/communication services 405 allow digital media supply chain operating system to link with other applications or systems. As a result, digital media supply chain operating system can facilitate the virtualization of applications and storage.

Digital media supply chain network 5 also includes digital distribution 300. Generally, digital distribution 300 includes a software based architecture to deliver digital content. Digital distribution 300 includes a MOIP interface 305, which may be any combination of hardware and software suitable for handling MOIP protocol communications, to provide an interface between digital warehouse 200 and digital distribution 300. MOIP interface 305 allows data to be transmitted from digital warehouse 200 to MOIP servers 310. MOIP servers include MOIP software 335 to handle MOIP data transmission and to send data to a client. MOIP software 335 may include a MOIP distributor 330 and a MOIP planner 325. MOIP distributor 330 is a software agent that handles the distribution of data to a client. MOIP planner 325 is a software agent that allows a user to search for selected content and formats over digital media supply chain system 5. Upon receiving the data, MOIP servers 310 may deliver the data to a client 320 running MOIP software 315. MOIP software 320 may be loaded on a variety of devices to allow the client to receive MOIP data. For example, the client may receive the data via a television 320a, computer 320b, PDA 320c or a laptop 320d, among other examples.

Figure 4:
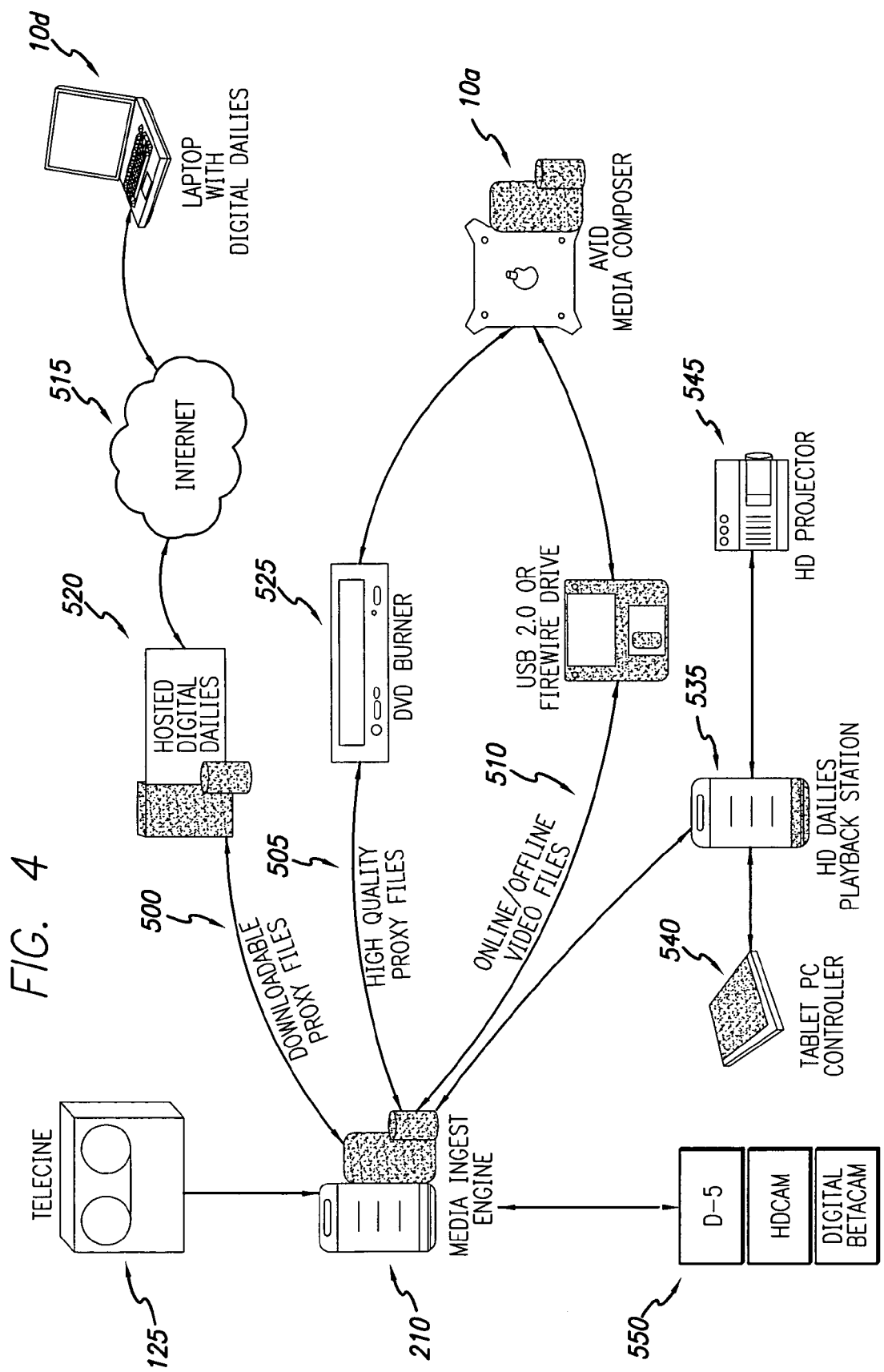
FIG. 4 shows an exemplary embodiment of the digital media supply chain network system utilizing digital dailies software and an encoder.

FIG. 4 shows another exemplary embodiment of the present invention and illustrates the operation of the digital dailies software 115, as shown in FIG. 2. Telecine 125 generates a video stream that is received by encoder 210. Encoder 210 is a software agent that may digitize the video stream content and create multiple versions of the video stream. For example, as shown in FIG. 4, encoder 210 generates downloadable proxy files 500, high quality proxy files 505 and video files 510. The files 500, 505 and 510 may be sent to different devices based on the format of the file. For example, downloadable proxy files 500 are uploaded to a hosted server, files 505 may be delivered to a DVD burner 525 and files 510 may be delivered to a USB or Firewire drive 530. As discussed above, the video stream is accordingly divided into essence data (e.g., high quality proxy files 505 to be stored on disk), session data (e.g., downloadable proxy files to be delivered to servers 520) and metadata (e.g., online/offline video files 510 stored on a hard drive). Accordingly, editors using servers 520 may utilize the session data, e.g., proxy files 500, to create new versions or edits of the video transmitted from telecine 125. Alternatively or in addition, encoder 210 may directly transmit the video data to projection devices 550 or a playback station 535 (which may in turn process the data for delivery to a projection device 545).

The digital dailies software 115 may integrate all three components in any combination depending on the desired application or output. For example, the session data may be stored in the storage devices associated with servers 520 until a new version of the video data file is created. Likewise, the metadata may be transmitted to servers 520 in order to update the file. The resulting files may be transmitted over the Internet 515 to a variety of tools such as a user's computer system 10d, or editing tool 10a. Computer system 10d may also contain digital dailies software to enable the user to maintain referential integrity between the proxy file and the original master file.

Figure 5:
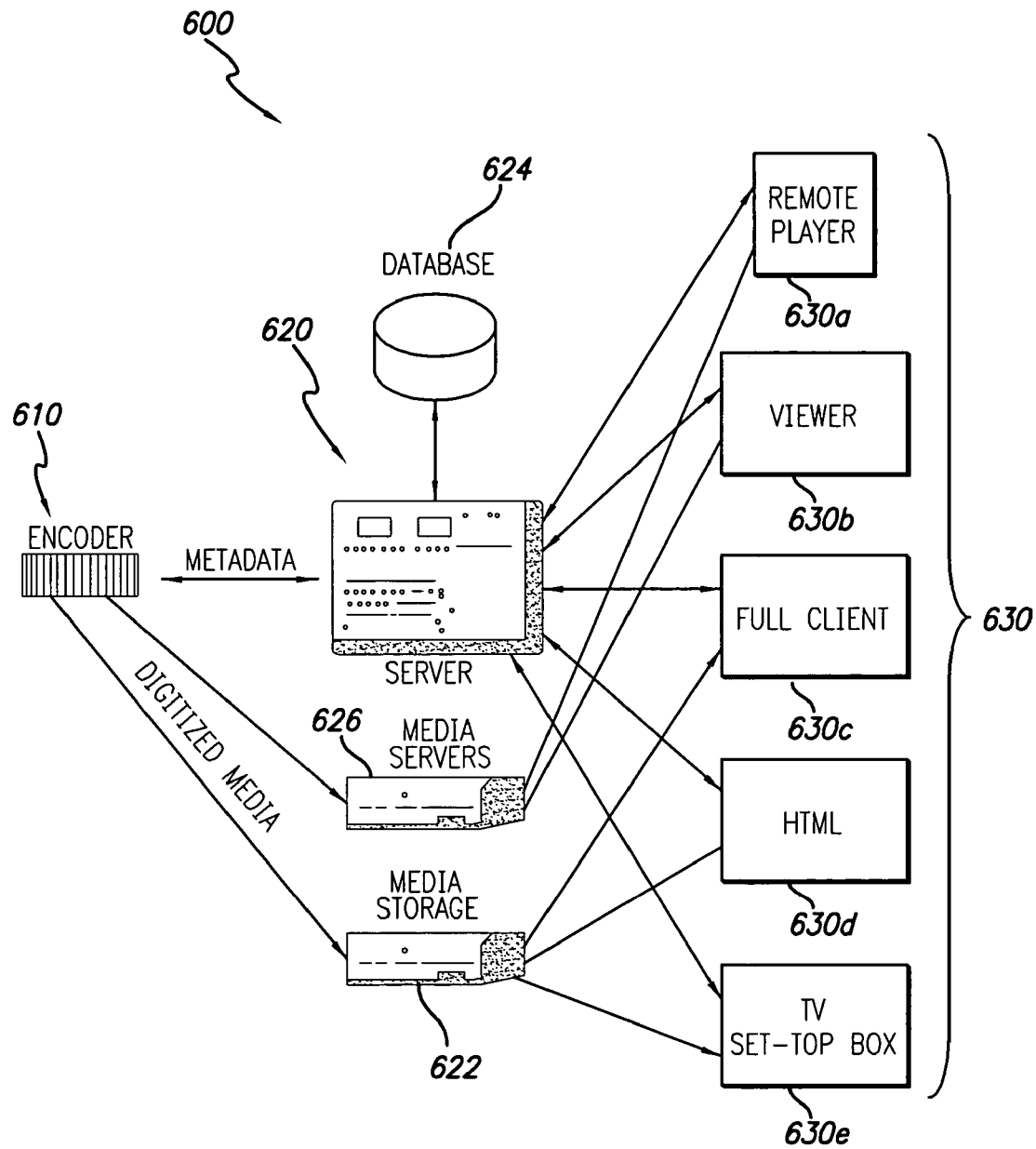
FIG. 5 shows an exemplary embodiment of an end-to-end system of the present invention.

FIG. 5 shows an alternative exemplary embodiment of the present invention and illustrates an end-to-end system 600 pursuant to aspects of the invention. The end-to-end system 600 can be located within a connection software layer, such as the connective software layer 20 shown in FIGS. 1 and 3. The end-to-end system 600 includes one or more encoders 610, a system server 620, and a plurality of end clients 630. The encoders 610 convert images, graphics, and moving pictures (or media) into data (i.e., ones and zeros). Once the media is converted to data, an intelligent media router (IMR) of the encoders 610 tags the data with metadata (e.g., containing information for routing the data). An IMR of the system server then directs or routs the data to the clients 630 or another server (not shown). As is provided in greater detail below, the IMR is implemented within the system 600 for the purpose of creating digitized (data) media, tagging it, transcoding it, and then forwarding through the server 620 for the purpose of distributing the digitized (data) media to several playback and/or play-out technologies and/or clients 630. The plurality of end clients 630 can include a remote player client 630a, a viewer client 630b, a full client 630c, an HTML client 630d, and a TV Set-Top Box client 630e.

In operation, the system 600 begins with the encoders 610 which can be connected to any film or video (analog/digital) system or technology. The encoders 610 captures the film or video signal and writes it to a local storage or disk (not shown) to capture in an uncompressed format. Once the film or video is captured to disk, the local IMR module or engine reads the active profile/route and determines the additionally needed formats to be created out of the uncompressed format of the film or video signal, if any. The encoders 610, using the IMR, then transcode and perform the IMR route functions as described in one or more profiles. As is provided in greater detail below, the profiles are set up and stored in advance on the encoder 610 by an IMR system administrator. Once the encoders 610 using its IMR is completed with the local route function processing, the encoders 610 call the IMR network communication functions and transfer global unique identifier (GUID) information, metadata, digitized (data) media, and/or DMOs to an IMR server.

The IMR server is running within the end-to-end system server 620. The system server 620 is configured with a database engine 624 for metadata and GUID information storage in addition to other data required to be stored in the system 600. The system server 620 is also configured with a media storage server 622 and media servers 626. The media storage server 622 is the digital file system in which the DMOs and digitized (data) media is persistent for computer hard disk storage. Media servers 626 are optional components used with media that require a real-time streaming function. The IMR within the system server 620 reads in local server configured profiles/routes and begins processing these route functions. If the route functions of the system server 620 are local to the system server 320, the route is completed. Once the route is completed, the digitized (data) media is made available to manual interaction via the plurality of end clients 630.

The end clients 630 are connected to the system server 620 via IMR communication protocols and can securely access the media. The end clients 630 provide client user interfaces to the system server 620. These interfaces include a full client 630c, a portable and light-weight viewer only client 630b, and HTML (and/or legacy) client 630d to be used for Internet access requirements, as well as legacy and non-supported systems, and/or a set-top box client 630e that provides a TV-centric user interface. In the case that a system server 620 has a route to another system server 620, the appropriately configured route functions are executed to transcode and transfer media to the next or many additional system servers 620. In the case of a route with a destination to remote controllable end client 630 for automated play-out, the remote end client 630 informs the system server 620 via an IMR module or engine of its status and availability. The remote end client 630 will then be issued a route and play-out routine from the system server's IMR. The play-out routine has a manually issued play function or can be configured to be fully automated with a defined play-out time/date.

Figure 6:
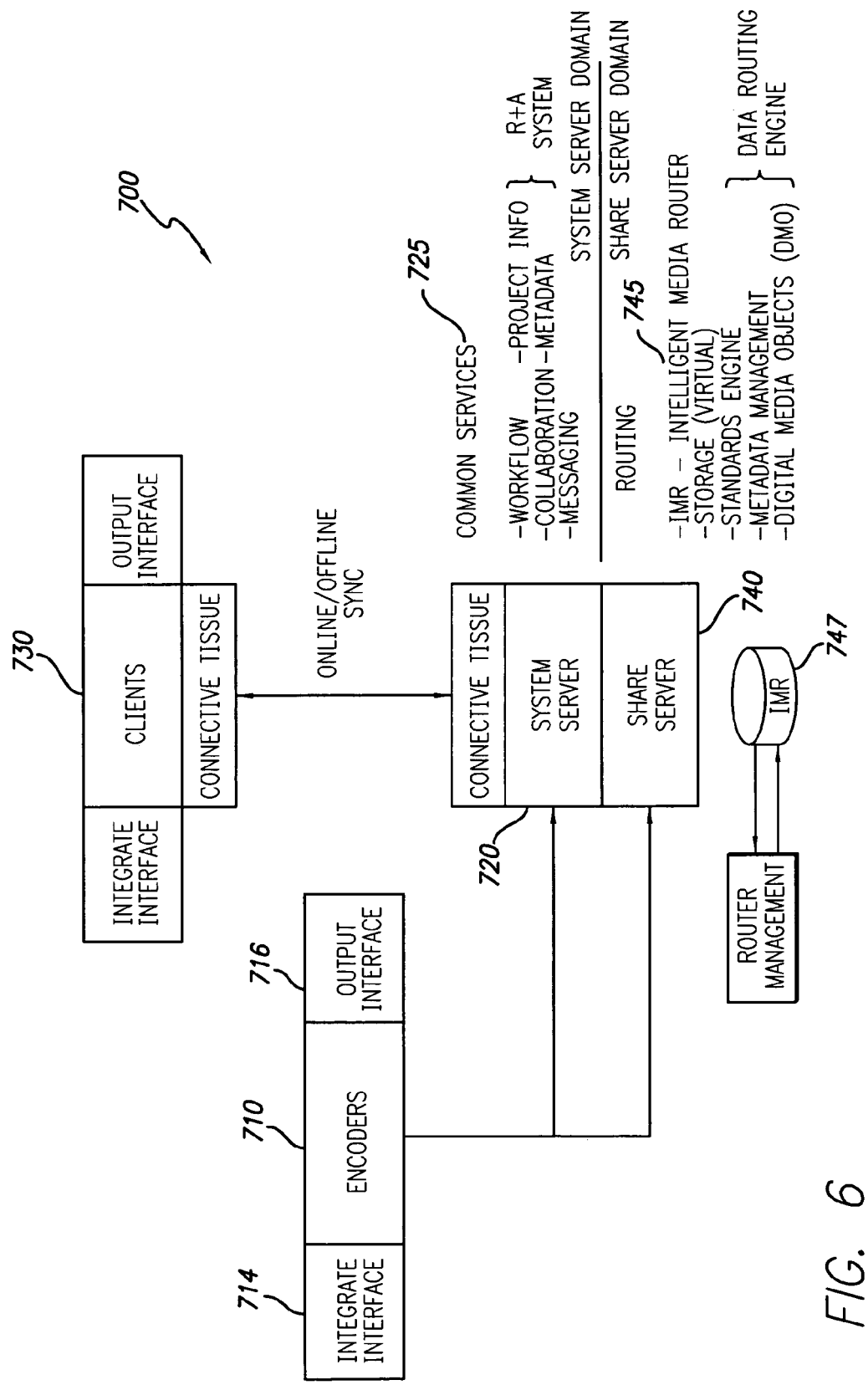
FIG. 6 shows an exemplary embodiment of an integrated system of the present invention.

FIG. 6 shows another alternative exemplary embodiment of the present invention and illustrates an integrated system 700 pursuant to aspects of the invention. The integrated system 700 includes one or more encoders 710, a system server 720, and various end clients 730 and can also be within a connection software layer, such as the connective software layer 20 shown in FIGS. 1 and 3. The system server 720 in this embodiment provides common services, such as workflow services, collaboration services, messaging services, project information services, and/or metadata services. In addition, the integrated system 700 includes a share integrate interface 714 coupled with the encoders 710 (and/or the end clients 730), an output interface 716 coupled with the encoders 710, and a share server 740 coupled with the system server 720 (and/or the end clients 730). The share server 740 provides routing functions 745, such as IMR functions via IMR 747, virtual data storage functions, data standard functions (i.e., locating and/or providing standards to data), metadata management functions, and/or DMO functions.

In operation, the integrated system 700 with its share integrate interface 714, output interface 716, and share server 740 provides a set of communication protocols and software development kits (SDKs) to allow third party developers to easily integrate the native IMR functions. An IMR engine of the IMR 747 then provides the needed, optimized, and/or customized IMR route functions. The integrate interface 714 is a set of IMR engine codes that provides remote input capabilities for third party software and system developers. It should be noted that this integrate interface 714 does not provide local IMR processing, but rather provides the ability for a third party software package or system to remote input digitized (data) media and a route profile to a remote IMR engine. This includes necessary IMR communication protocols. The output interface 716 is a set of IMR engine codes that provides remote output capabilities for third party software and system developers. Similar to the integrate interface 714, this output interface 716 does not provide local IMR processing, but rather provides the ability for a third party software package or system to remotely output digitized (data) media. The output interface 716 includes IMR communication protocols to enable remote control functions back to modules or engines of the IMR. This includes all IMR status functions and IMR service descriptions that are conveyed back to the modules or engines within an IMR domain.

Note that in the embodiment of FIG. 6, the integrated system 700 also includes the encoders 710 and the end clients 730. These components have similar functionality as the corresponding components of the end-to-end system 600 shown in FIG. 5.

Figure 7:
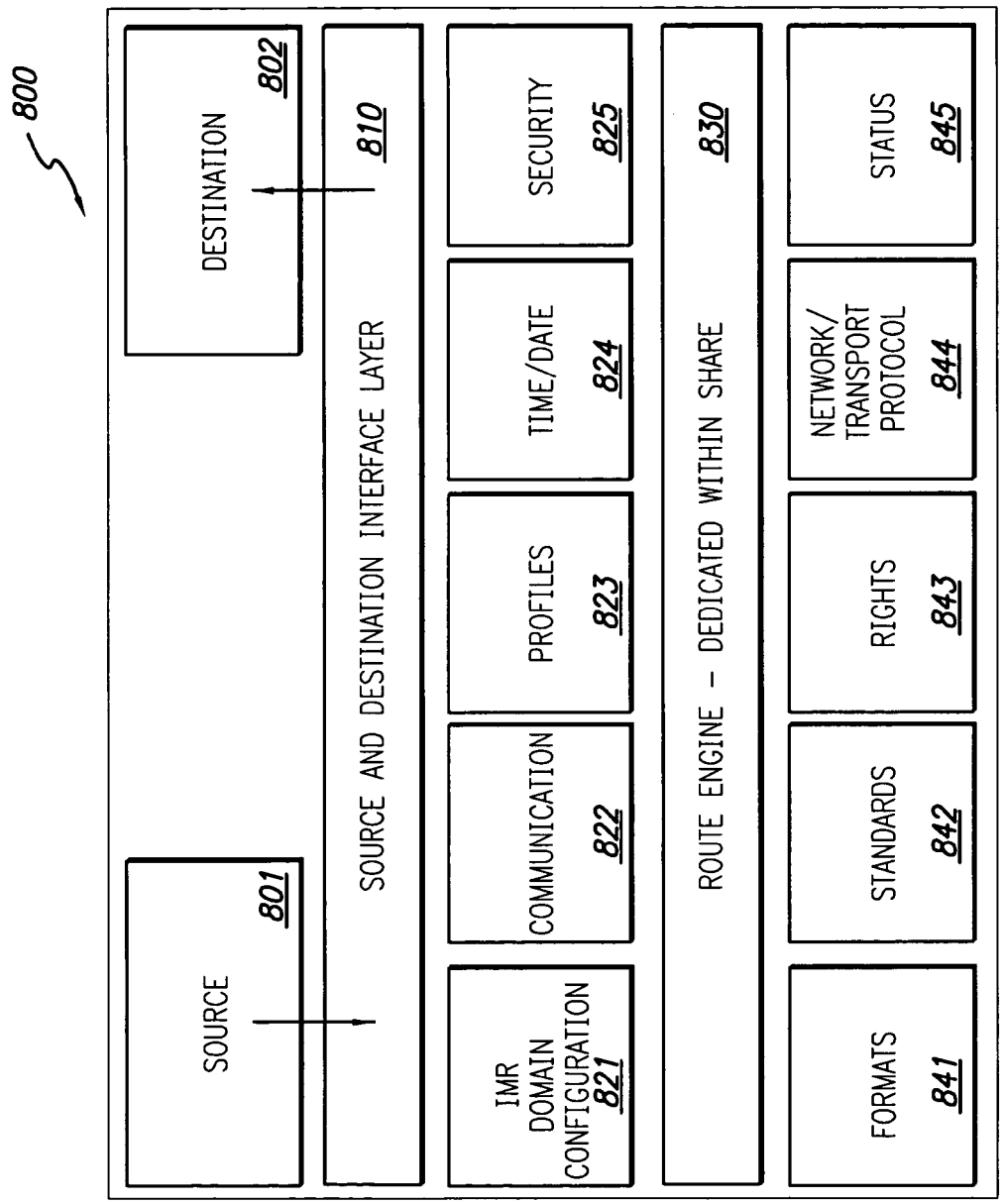
FIG. 7 shows an exemplary embodiment of the software architecture of an intelligent media router (IMR) of the present invention.

FIG. 7 shows an exemplary embodiment of the software architecture of an IMR 800 pursuant to aspects of the invention. As shown by the end-to-end system 600 of FIG. 5, the IMR 800 can reside in or between encoders and servers, e.g., encoders 610, 710 and services 620, 720, 740, and functions within the connective software layer 20 shown in FIGS. 1 and 3. The IMR 800 is an router engine written as software to process media that has been either created as data or media that has been digitized. The router engine is software code/technology that is modular. As is shown in FIG. 5, the architecture of IMR 800 can include encoders 610, system server 620, and the various end clients 530 (or end client software products). The IMR 800 is built into these components (i.e., the encoders 610, the system server 620, etc.) of the end-to-end system 600 in various manners. Each component utilizes common IMR services and functions, but not all IMR functionality needs to be included in each IMR implementation. This provides for a simplified and reduced functionality IMR 800 and allows the IMR 800 to be more easily implemented within components on a system.

The IMR 800 is developed as a set of software modules or engines to allow for its ease of implementation. A module or engine of the IMR 800 is designed to be able to communicate with other modules or engines of the IMR 800. This communication shares digitized (data) media, routes, rights, and profiles within the IMR domain. An IMR domain is a mesh and can share route functions between IMR modules to optimize the defined route. The IMR 800 looks at digitized (data) media at the digital media object (DMO) level and can perform route functions upon a set of, or all DMOs that are defined within a source 801.

The IMR 800 includes the source 801 and a destination 802. The source 801 is an input source, a location, and a format of a route for incoming digitized media or video source that is to be digitized; this can defined down to the device and related device driver. The source 801 can be broken down to the digital media object (DMO) level and can tag and define each DMO with a global unique identifier (GUID). The destination 802 is a route that includes location, format, time to be delivered, size, and other properties to completely define a target destination for a route; this can include a device and its related device driver. A route defines the entire path/format/other properties for media objects.

The IMR 800 also includes a route engine 830. The route engine 830 is a component within the IMR 800 that triggers the action to begin, pause, end a route or route function.

The IMR 800 or the domain of the IMR 800 is a collection or grouping of modules or engines that are logically defined as an entity through some trusted relationship and is configured by IMR domain configuration module 821 within the IMR 800. In the context of the present embodiment, a network path defines the path to which a route will take. This can be manual or dynamically established by a network function module 844. The network function module 844 can also be used to establish a network type, a network protocol, and/or a network packet. The network type defines the type of network to which a route will use; options include token ring, Ethernet, storage, ATM, frame relay, MPLS, VPN, Internet, satellite transmission, or other network technology defined or added to the IMR 800. The network protocol defines the particular protocol and ports used by the IMR 800 and the network to optimize for routing media; this can include TCP/IP and/or a protocol, such as FTP and/or HTTP. The network packet size/type defines the type of network protocol packets utilized for a route and its relevant size; as an example TCP, UDP and an associate byte size.

A time/date module 824 within the IMR 800 can be used to define the time and date of all transactions processed using the IMR 800; this is used for tracking and scheduling purposes.

A format function module 841 within the IMR 800 establishes video formats for utilization by the IMR 800 that are local within the IMR 800 or remotely provided to the IMR 800. The video formats define the video imaging formats supported by the local IMR 800 and can also be used to provide knowledge of the video formats on remote IMR systems. The format function module 841 can also establish graphic formats for utilization by the IMR 800 that are local with the IMR 800 or remotely provided to the IMR 800. The graphic formats define the graphic imaging formats supported by the local IMR 800 and can also be used to provide knowledge of the graphic formats on remote IMR systems.

In addition, module 841 can establish data formats supported by the local IMR and/or it can establish knowledge of the data on remote IMR systems to support these data.

A standard function module 842 is used by the IMR 800 via route engine 830 to define industry defined and support "standards" that are documented and defined for software implementation; these "standards" usually have a defined set of video/graphic formats as well as a related metadata schema, most often implemented as XML. As an example, in the media industry, MPEG, MXF and AAF are standards that define video sources, formats, and metadata schemas. In the medical industry, DICOM is a standard for sources, formats and metadata. In the news industry, MOS is a standard for sources, formats and metadata. In the cable/broadcast industry, DOCSIS and DVB are standards for sources, formats and metadata. Therefore, the standard function module or engine 842 within the IMR 800 exists to interact with some or all of the above described standards and provides execution of the defined standard's rules.

A profile module 823 can be used to establish a standard profile and a route profile. The standard profile defines which standard(s) must be interpreted from the source and which standard(s) will be utilized for the destination. The route profile defines the configured elements of a route and is mapped to a related source or destination, set of media types, network types, or standards. The route profile is stored and can be shared and made available via XML.

In addition, the IMR 800 may also include a router map (not shown) that displays the set of encoders, servers, and play-out systems within a IMR topology, while listing out their current status and capabilities. The router map can be provided via a status function module 845 for providing a route status. The route status defines the current state of a given route, route function or IMR device. In addition, the status module function 845 has a management component used to interface and retrieve the route status states. In the context of this embodiment, the IMR device is defined as any device and its capabilities that runs and executes the IMR software and related components. The route function is defined as a given task performed within a defined route.

A communication module 822 is used to provide the IMR communication protocol. The IMR communication protocol is defined as the protocol and method for IMR modules (or engines) to communicate with one another, this protocol uses a secure connection (with optional layer of encryption).

A right function module 843 establishes IMR rights. The IMR rights are defined as a set of rules, terms and expressions that define what given IMR modules or engines within a connected domain, cluster, organization, taxonomy or grouping can perform at a route function level. As an example, IMR rights can define that only a specifically defined set of route functions can be utilized within a profile or route. The IMR rights are implemented as an expression language that is stored within the route profile and transmitted between IMR modules or engines so that these engines or modules can be "trusted" entities. The right function module 843 is also used to enforce a route confirmation state, a route failure state, a route acknowledgment, and a IMR security module 825. The route confirmation state is defined as a state that the route has successfully completed. The route failure state is defined as a state that a given route has failed to complete successfully. The route acknowledgement is a message between IMR modules or engines to confirm that IMR communication between the source 801 and the destination 802 is enabled for a given route.

The IMR security module 825 provides a secure access layer to allow and/or disallow users to interact with the IMR 800 as well as to define administrator level permissions for IMR system administration functions, as well as IMR profile/route configurations.

Figure 8:
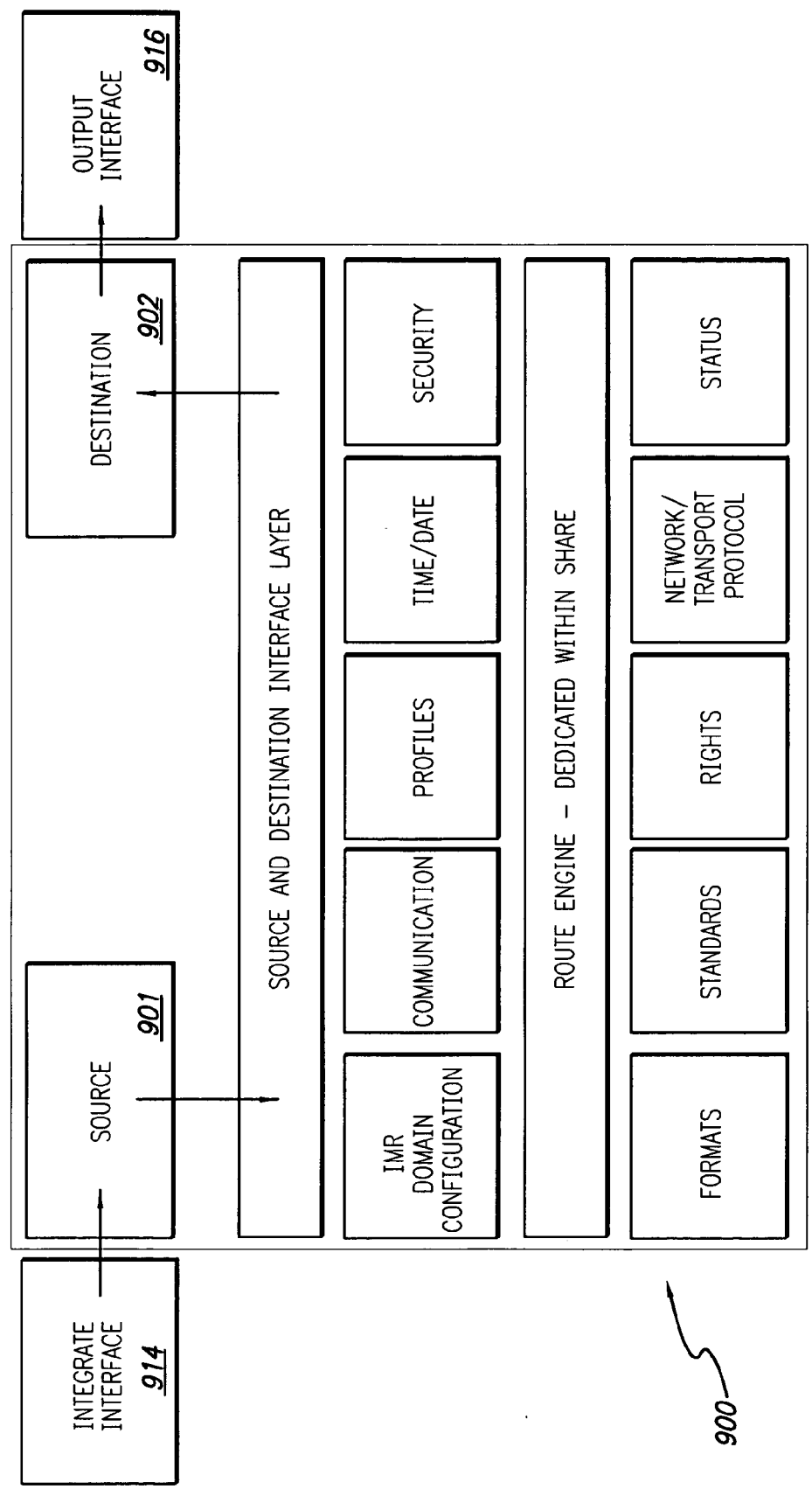
FIG. 8 shows another exemplary embodiment of the software architecture of an IMR having an integrate interface and an output interface of the present invention.

FIG. 8 shows another exemplary embodiment of the software architecture of an IMR 900 pursuant to aspects of the invention. As shown by the integrated system 700 of FIG. 6, the IMR 900 can be developed into its own component (e.g., 747). In this case, the IMR 900 is designed to be able to communicate with other IMR or router engines and includes an integrate interface 914 and an output interface 916. The integrate interface 914 is coupled with a source 901 of the IMR 900 and the output interface 916 is coupled with a destination 902 of the IMR 900. The integrate interface 914 provides interfaces with third party imaging systems and software to allow for native IMR input. The output interface 916 provides interfaces with third party imaging systems and software to allow for native IMR output.

Note that in the embodiment of FIG. 8, with the exceptions of the integrate interface 914 and the output interface 916, the other components and functions of this IMR 900 are similar to the components and functions of the IMR 800 shown in FIG. 7.

According to the foregoing, the source 801, 901 receives media that is either created natively using software tools or is digitized from a film or video stream. Once the native or digitized media sources are fed into the IMR 800, 900, every frame of the media is unique and globally identified (GUID). The media is then written to the local storage point, which can be internal to the IMR 800, 900 or connected via accepted storage connections, such as network attached storage, fiber channel, SCSI, or storage area networks. The IMR 800, 900 has a database on the exact location and availability of this storage.

As the media is written to the media storage device, each frame of video or individual graphic is reviewed, tagged, and cataloged with metadata. During this stage, the IMR 800, 900 using its profile module or engine 823 reads in the route profile and determines needed route functions and destinations of the received media. In one embodiment, the route profile can be read in from a central server rather than pre-configured on a local IMR 800, 900, as is shown in FIGS. 7 or 8.

The IMR profile engine 823 then determines if it has the capability to execute the route functions or requires additional IMR processing resources. Assuming the IMR 800, 900 has the local capabilities, it begins to process the route profile, executes one of more individual route functions making sure to enforce the provided set of IMR rights via right function module 843.

In addition, as the IMR 800, 900 begins to process the route, the IMR 800, 900 can begin to transfer DMOs or other data bits from it to the next destination or destination route, adhering to route network definition for network type, transport, and settings via network function module 844. The IMR 800, 900 can then transfer the DMOs or other data bits in a one-to-one manner with a store and forward capability to transfer DMOs to subsequent down-stream IMR modules or engines. It can also transfer DMOs in a one-to-many or multicast manner to multiple IMR modules or engines at the same time.

Moreover, during a given routing process, the IMR 800, 900 reports the status of the states of given route functions via its status function module or engine 845. Once a route is completed, the destination IMR receives all DMOs. If all the DMOs have not been received, the source IMR 800 provides additional routes or route functions as required until a route confirmation is sent back to the source IMR 800, 900 and the route is designated as being completed by the status function module 845.

It should be appreciated to those skilled in the art that an IMR of the present invention can process multiple routes at the same time, assuming adequate process capability of the computer system. In addition, the above described mechanisms and processes of the IMR are for purposes of example only, and the invention is not limited thereby.

Accordingly, the system and method of the present invention allows a user or a group of users to utilize widely different hardware and software tools to provide digital content. In particular, a user may initially manufacture digital content once using presently available tools and media formats. Subsequently, the user may then warehouse, deliver and display this digital content in multiple ways.

Having thus described preferred embodiments of a system and method for providing a digital media supply chain for the creation, storage and distribution of digital media using standardized communication and protocol interfaces, it should be apparent to those skilled in the art that certain advantages of the described system and method have been achieved. It should also be appreciated that various modifications, adaptations, and alternative embodiments thereof may be made within the scope and spirit of the present invention. The invention is further defined by the following claims.

What is claimed:

1. A system for connecting disparate information manufacturers with disparate information distributors, the system comprising:
    an encoder for converting data from a first information form to data having an essence data portion and a metadata portion;
    a system server coupled with said encoder, said system server providing a plurality of common services for the system;
    a share server coupled with said system server, said share server having a plurality of communication protocols and a plurality of software development kits (SDKs);
    an intelligent media router (IMR) coupled with said share server, said IMR having a plurality of modules interconnected in a trusted relationship, said plurality of modules providing a plurality of routing functions for the system;
    an integrate interface coupled with said encoder, said integrate interface remotely providing one or more remote inputs from one or more third party imaging input systems; and
    an output interface coupled with said encoder, said output interface remotely providing one or more IMR outputs to one or more third party imaging output systems;
    wherein said plurality of communication protocols and said SDKs of said share server allows said third party imaging input and output systems to remotely utilize said plurality of modules of said IMR, a first module of said IMR tags said metadata portion of said data with metadata for routing said data, a second module of said IMR directs the data for distribution by information distributors based on said tagged metadata, and a third module of said IMR converts said data into a second information form acceptable for distribution by the information distributors.

2. The system of claim 1, wherein said IMR reviews said data to determine the format of said second information form to be created out of said data.

3. The system of claim 1, wherein said IMR reviews said data to identify a global unique identifier (GUID) of said data.

4. The system of claim 1, wherein said data is a digital media object (DMO).

5. The system of claim 1, further comprising:
an end client coupled with said system server;
wherein said second information form is viewed on said end client.

6. The system of claim 1, further comprising:
a plurality of end clients coupled with said system server, said plurality of end clients comprising a remote player client for viewing and manipulating said second information form, a portable and light-weight viewer only client for only viewing said second information form, an HTML client for interfacing said second information form via the Internet, a legacy client for interfacing said second information form via a legacy system, and a set-top box client for interfacing said second information form via a television.

* * * * *